US 9,259,686 B2

(12) United States Patent
Ogiwara et al.

(10) Patent No.: US 9,259,686 B2
(45) Date of Patent: *Feb. 16, 2016

(54) WATER PRODUCING SYSTEM AND OPERATION METHOD THEREFOR

(75) Inventors: Wakako Ogiwara, Otsu (JP); Hiroo Takabatake, Otsu (JP); Masahide Taniguchi, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 704 days.

This patent is subject to a terminal disclaimer.

(21) Appl. No.: 13/517,165

(22) PCT Filed: Oct. 18, 2010

(86) PCT No.: PCT/JP2010/068244

§ 371 (c)(1),
(2), (4) Date: Jun. 19, 2012

(87) PCT Pub. No.: WO2011/077815

PCT Pub. Date: Jun. 30, 2011

(65) Prior Publication Data

US 2012/0255907 A1    Oct. 11, 2012

(30) Foreign Application Priority Data

Dec. 25, 2009  (JP) ................ 2009-293899

(51) Int. Cl.
*B01D 61/58*    (2006.01)
*B01D 61/04*    (2006.01)
(Continued)

(52) U.S. Cl.
CPC ............ *B01D 61/58* (2013.01); *B01D 61/02* (2013.01); *B01D 61/04* (2013.01); *B01D 61/08* (2013.01);
(Continued)

(58) Field of Classification Search
CPC .... B01D 61/022; B01D 61/025; B01D 61/04; B01D 61/08; B01D 61/10; B01D 61/12; B01D 61/142; B01D 61/45; B01D 61/147; B01D 61/16; B01D 61/18; B01D 61/20; B01D 61/22; B01D 63/00; B01D 65/00; B01D 2311/04; B01D 2311/06; B01D 2311/08; B01D 2311/12; B01D 2311/16; B01D 2311/22; B01D 2311/246; B01D 2311/2688; B01D 2313/083; B01D 2313/50; B01D 2317/02; B01D 2317/022; B01D 2317/025; B01D 2317/04; B01D 2317/06; B01D 2317/08; C02F 1/006; C02F 1/44; C02F 1/441; C02F 1/442; C02F 1/444; C02F 2203/00; C02F 2209/00; C02F 2209/40; C02F 2209/42; C02F 2209/44; C02F 2301/04; C02F 2301/043; C02F 2301/08; G05D 11/02; G05D 11/03; G05D 11/035; B01F 3/08; B01F 3/0803; B01F 3/0861; B01F 3/0865; B01F 3/088; B01F 2003/0884; B01F 2215/045
USPC .......... 137/3, 109–111, 114, 115.01, 115.03, 137/115.04; 210/87, 101, 103, 130, 132, 210/134, 137, 138, 257.2, 258, 259, 321.6, 210/4, 16.1, 416.3, 631, 641, 650, 739, 210/744; 366/131, 134, 152.1, 154.1, 366/160.1, 160.2, 160.3, 162.1, 160.5
See application file for complete search history.

(56) References Cited

U.S. PATENT DOCUMENTS 6,113,797 A    9/2000 Al-Samadi
(Continued)

FOREIGN PATENT DOCUMENTS

CN    2910907    6/2007
(Continued)

OTHER PUBLICATIONS

Entire patent prosecution history of U.S. Appl. No. 13/386,231, filed Aug. 14, 2012, entitled, "Water Producing System."
(Continued)

Primary Examiner — Joseph Drodge
(74) Attorney, Agent, or Firm — RatnerPrestia

(57) ABSTRACT

A water producing system which is provided with a semi-permeable membrane treatment process A100 to produce membrane permeate A3 and concentrate A, a semi-permeable membrane treatment process B200 which is equipped with a treatment target water B branching means for branching treatment target water B2 into two or more to produce a membrane B5 and concentrate B6, and a semi-permeable membrane treatment process C300 which is equipped with a first water mixing means for mixing one of the treatment target water B with at least part of the concentrate A, and subjects the mixed water to the semi-permeable membrane treatment to produce membrane permeate C7 and concentrate C8, thereby producing fresh water from a plurality of kinds of raw water which differ in osmotic pressure.

14 Claims, 12 Drawing Sheets

(51) Int. Cl.
  B01D 61/08 (2006.01)
  C02F 1/44 (2006.01)
  B01D 61/02 (2006.01)
  B01D 61/16 (2006.01)
  B01D 61/14 (2006.01)
  C02F 1/00 (2006.01)
  C02F 3/12 (2006.01)
  C02F 103/08 (2006.01)

(52) U.S. Cl.
  CPC . B01D 61/16 (2013.01); C02F 1/44 (2013.01); B01D 61/025 (2013.01); B01D 61/027 (2013.01); B01D 61/145 (2013.01); B01D 61/147 (2013.01); B01D 2311/04 (2013.01); B01D 2317/022 (2013.01); B01D 2317/025 (2013.01); B01D 2317/04 (2013.01); B01D 2317/06 (2013.01); B01D 2317/08 (2013.01); B01D 2321/16 (2013.01); C02F 1/006 (2013.01); C02F 1/441 (2013.01); C02F 1/442 (2013.01); C02F 3/1268 (2013.01); C02F 2103/08 (2013.01); Y02W 10/15 (2013.01)

(56) References Cited

U.S. PATENT DOCUMENTS

| | | | |
|---|---|---|---|
| 6,187,200 | B1 | 2/2001 | Yamamura |
| 6,190,556 | B1* | 2/2001 | Uhlinger ............... 210/636 |
| 6,645,383 | B1* | 11/2003 | Lee et al. ............... 210/652 |
| 6,946,081 | B2 | 9/2005 | Voutchkov |
| 7,368,058 | B2* | 5/2008 | Nishikawa et al. ........... 210/652 |
| 7,981,295 | B2* | 7/2011 | Al-Samadi ................ 210/652 |
| 2005/0029192 | A1* | 2/2005 | Arnold et al. ............... 210/641 |
| 2005/0067341 | A1* | 3/2005 | Green et al. ............ 210/321.69 |
| 2006/0144787 | A1 | 7/2006 | Schmidt |
| 2007/0246406 | A1 | 10/2007 | Dibel |
| 2008/0067125 | A1* | 3/2008 | Wilkins et al. ............... 210/641 |
| 2008/0314807 | A1* | 12/2008 | Junghanns et al. ............ 210/85 |
| 2009/0090676 | A1 | 4/2009 | Johnson |
| 2009/0283464 | A1* | 11/2009 | Oe et al. ................... 210/198.1 |
| 2010/0224558 | A1* | 9/2010 | Barker ................... 210/636 |
| 2010/0314313 | A1 | 12/2010 | MacLaggan |
| 2011/0042306 | A1 | 2/2011 | Ito et al. |
| 2011/0056878 | A1* | 3/2011 | Matsushiro et al. ....... 210/257.2 |
| 2011/0139712 | A1 | 6/2011 | Ito et al. |
| 2011/0139716 | A1 | 6/2011 | Ito et al. |
| 2011/0147310 | A1 | 6/2011 | Ito et al. |
| 2011/0163036 | A1 | 7/2011 | Ito et al. |
| 2011/0315632 | A1* | 12/2011 | Freije et al. ................. 210/636 |
| 2012/0145630 | A1 | 6/2012 | Ogiwara |
| 2012/0255907 | A1 | 10/2012 | Ogiwara |

FOREIGN PATENT DOCUMENTS

| | | |
|---|---|---|
| JP | 4137795 | 12/1992 |
| JP | 11-010146 | 1/1999 |
| JP | 200146842 | 2/2001 |
| JP | 2001239134 | 9/2001 |
| JP | 2002-205070 | 7/2002 |
| JP | 2003-200182 | 7/2003 |
| JP | 2003/251383 | 9/2003 |
| JP | 2003-285058 | 10/2003 |
| JP | 200481903 | 3/2004 |
| JP | 2004130233 | 4/2004 |
| JP | 2005224651 | 8/2005 |
| JP | 3957081 | 5/2007 |
| JP | 2007152265 | 6/2007 |
| JP | 2007-313445 | 12/2007 |
| JP | 2008100219 | 5/2008 |
| JP | 2008126137 | 6/2008 |
| JP | 2008161797 | 7/2008 |
| JP | 2010149100 | 7/2010 |
| WO | 2006099080 | 9/2006 |
| WO | 2006128730 | 12/2006 |
| WO | 2007144591 | 12/2007 |
| WO | 2009144335 | 12/2009 |
| WO | WO2010/061879 A1 | 6/2010 |
| WO | 2011021415 | 2/2011 |
| WO | 2011077815 | 6/2011 |

OTHER PUBLICATIONS

International Search Report dated Aug. 17, 2010, Application No. PCT/JP2010/058523.
Supplementary European Search Report dated Nov. 12, 2013, Application No. EP 10802121.
A. J. van Gottberg et al., "World\s Largest Membrane-based Water Reuse Project", Proc. IDA World Congress, Bahama, 2003.
Chinese Office action dated Mar. 8, 2013, application No. 201080034218.9.
Chinese Office Action with English Translation, issued Jan. 10, 2014, application No. 201180014114.6.
Decision on Rejection Based on Corresponding Chinese Patent Application, CN 201180014114.6, With English Translation, Issued Jun. 30, 2014.
Entire patent prosecution history of U.S. Appl. No. 13/391,354, filed Feb. 20, 2012, entitled, "Fresh Water Generator.".
Entire patent prosecution history of U.S. Appl. No. 13/634,681, filed Sep. 13, 2012, entitled, "Method for Producing Fresh Water."
In-Depth Examination Result and English Translation for Corresponding Mexican Patent Application No. MX/a/2012/010665, Issued on October 20, 2014.
International Search Report dated Aug. 17, 2010, application No. PCT/JP2010/058800.
International Search Report dated May 10, 2011, application No. PCT/JP2011/055538.
Kobelco Eco-Solutions Co., Ltd, and other three companies, model project of Ministry of Economy, Trade and Industry, demonstration trials in Shunan-shi, [on-line], Mar. 5, 2009, Nippon Suido Shinbun Co., [search on Jul. 2, 2009], Internet <URL: http://www.suido-gesuido.co.jp/blog/suido/2009/03/post_2780.html>.
Patent Examination Report No. 1 (Office Action) Based on Corresponding Australian Patent Aplication, AU 2011228323, Issued August 22, 2014.
Singapore Office Action issued Sep. 26, 2013, application No. 201206766-6.
Singapore Second Written Opinion, Issued May 14, 2014, for Application No. 201206766-6.
International Search Report dated Jan. 18, 2011, application No. PCT/JP2010/068244.
Chin et al., "Increasing Water Resources through Desalination in Singapore: Planning for a Sustainable Future," IDA World Congress-Atlantis, The Palm-Dubai, UAE Nov. 7-12, 2009, PEF: IDAWC/DB09-033, pp. 1-7.
Office Action mailed Jan. 26, 2015 for U.S. Appl. No. 13/391,354.
Entire patent prosecution history of U.S. Appl. No. 14/351,988, filed Apr. 15, 2014, entitled, "Fresh Water Generation System.".
Japanese Office Action mailed Mar. 17, 2015 in Japanese Application No. 2011-517134.
Non-Final Office Action mailed May 19, 2015 in U.S. Appl. No. 13/634,681.
Australian Office Action mailed May 22, 2015 for Australian Application No. 2010334047.
Office Action mailed Jun. 26, 2015 for U.S. Appl. No. 13/386,231.

* cited by examiner

WATER PRODUCING SYSTEM AND OPERATION METHOD THEREFOR

CROSS REFERENCE TO RELATED APPLICATION

This application is the U.S. National Phase application of PCT International Application No. PCT/JP2010/068244, filed Oct. 18, 2010, and claims priority to Japanese Patent Application No. 2009-293899, filed Dec. 25, 2009, the disclosures of both applications are incorporated herein by reference in their entireties for all purposes.

FIELD OF THE INVENTION

The present invention relates to a water producing system utilizing composite water treatment technologies, and an operation method therefor, and to a water producing system in which fresh water is produced from plural kinds of raw water, and an operation method therefor. In more detail, the present invention relates to a fresh water producing system that can be applied to the field of water clarification treatment in waterworks, and the field of industrial-use water production such as industrial water, food and medical process water, agricultural water, and semiconductor-related component cleaning water.

BACKGROUND OF THE INVENTION

In recent years, technologies relating to a separation membrane are being developed, and with characteristics such as space-saving, energy-saving, and filtrate water quality improvement, the technologies are widely used for various purposes such as water treatment. For example, a microfiltration membrane (MF membrane) and an ultrafiltration membrane (UF membrane) are applied to a water cleaning process for producing industrial water or tap water from river water, groundwater, or treated sewage, and applied to pre-treatment and a membrane bioreactor in a seawater desalination reverse osmosis membrane treatment step. A nanofiltration membrane (NF membrane) and a reverse osmosis membrane (RO membrane) are applied to removal of ions, seawater desalination, and a wastewater reclamation process.

Currently, as a method for reclaiming sewage/drainage, for example, there is a method of performing treatment called a "membrane bioreactor (Membrane Bioreactor; MBR)" in which sewage or industrial drainage which has conventionally been treated by an activated sludge process is treated by the MF/UF membrane directly immersed in an activated sludge tank, and performing filtration with the NF/RO membrane installed at the later stage to obtain pure water as product water.

As a system for producing fresh water from seawater or brackish water, there is a technology in which pre-treatment by sand filtration which is a conventional water clarification technology is carried out, and thereafter filtration is carried out with the NF/RO membrane. In addition, there is a method in which seawater or brackish water is pre-treated using the MF/UF membrane as described above, and filtration is carried out with the NF/RO membrane. With this system, since seawater cannot be desalted by the pre-treatment, desalination entirely depends on the treatment with the NF/RO membrane at the later stage.

With the NF/RO membrane separation method, supply pressure being higher than osmotic pressure is desired. Thus, pressure must be applied when supplying raw water to the NF/RO membrane with a pump called a "booster pump". That is, as a salt concentration of raw water supplied to the NF/RO membrane is higher, the osmotic pressure becomes higher. Thus, it becomes necessary to apply higher pressure with the booster pump, and more energy for allowing the booster pump to operate becomes necessary.

Therefore, in a water producing plant, only one of a sewage/wastewater reclamation process and a seawater desalination process is performed in general. However, in recent years, a membrane treatment system integrating a sewage high-level treatment process and the seawater desalination process has been developed (Patent Document 1, Non-Patent Document 1, Non-Patent Document 2). According to this technology, after sewage is treated by the MBR, fresh water is produced using an RO membrane, and concentrate produced as a by-product at the time of separation of the RO membrane is mixed with seawater. Thus, a salt concentration in the supplied seawater is lowered, and hence the specification of the booster pump in an operation of RO membrane separation used in seawater desalination can more be simplified than in the conventional manner. Therefore, the system becomes further energy-saving.

In such an integrated membrane treatment system using plural kinds of raw water, for example, sewage/drainage and seawater from different supply sources are used as raw water. Thus, feed water quantities thereof are sometimes largely changed from time to time. In particular, sewage/drainage is easily changed due to a human activity time, a plant operation time, or the like. When the respective feed water quantities of raw water are changed, a mixing ratio between the RO membrane concentrate produced as a by-product from a sewage treatment line and seawater is changed. Thus, the salt concentration (osmotic pressure) in seawater to be supplied to the RO membrane on the side of a seawater treatment line is changed.

In a case where although a necessary product water quantity is determined, a sewage/drainage quantity is largely changed, and the product water quantity is ensured by a seawater intake quantity, the salt concentration after mixing is sometimes largely changed. Thus, there is a need for installing a booster pump capable of responding to high pressure to low pressure on the side of the seawater treatment line. When a booster pump having large capacity is controlled and operated by an inverter or the like, efficiency is interior at the time of low pressure, so that an energy-saving effect is decreased. When the mixing ratio of seawater is too high, an effect of diluting the sewage RO membrane concentrate relative to seawater is decreased, and the salt concentration is not really lowered. Thus, there is a problem that an advantage of the integrated membrane treatment system is almost lost. Further, in a case of a fixed mixing ratio, when the feed water quantity of sewage/drainage is decreased, the sewage RO membrane concentrate is unavoidably reduced. Thus, mixing seawater is also reduced, and the feed water to the RO membrane on the side of the seawater treatment line is reduced. Therefore, there is also a problem that the necessary product water quantity cannot be obtained.

In each plant of a sewage plant and other plants, an inflow quantity of sewage and a discharge quantity of drainage are generally determined. In a case where such sewage and drainage are taken as raw water and a collection rate and a mixing ratio of an RO membrane process are uniformly determined, the product water quantity of the system is naturally decided, and the quantity does not always match with user needs. In a case where the sewage/drainage quantity is small but the necessary product water quantity is large, in the system of Patent Document 1, Non-Patent Document 1, Non-Patent Document 2, a concentrate quantity of the sewage/drainage RO membrane process is decreased, and when the seawater intake quantity is increased at a designing stage, there is a problem that an energy-saving effect is small in the system.

Meanwhile, as an example that the sewage high-level treatment and the seawater desalination are performed in one water producing plant, there is a known method of supplying sewage/drainage in a case where sewage/drainage having a lower salt concentration than seawater or brackish water exists as feed water, or supplying seawater or brackish water in a case where sewage/drainage cannot be supplied due to the dry season, stoppage of the plant, or the like (Patent Document 2 and Non-Patent Document 3). According to this technology, sewage/drainage is used as feed water. Thus, the technology is more energy-saving than the seawater desalination using only seawater or only brackish water, and a fixed flow rate of product water can be surely obtained.

In a system in which sewage/drainage is switched with raw water having a different salt concentration (osmotic pressure) such as sewage/drainage and seawater or brackish water to perform filtration with the same RO membrane as in Patent Document 2 and Non-Patent Document 3, the system is often chosen in accordance with the sewage/drainage quantity which is an already determined water quantity.

In recent years, seawater desalination with a reverse osmosis membrane is adopted in a drought-prone region such as the Middle East, and there are a number of large-sized reverse osmosis membrane plants whose water production quantity exceeds 100 thousand m3/d. It is predicted that a necessary water production quantity will be increased and large-sized reverse osmosis membrane plants will be increased in the future.

An enough sewage/drainage quantity can be ensured when a plant is constructed near a large-sized sewage plant and a large plant. However, it is difficult to ensure a large sewage/drainage quantity in a small sewage plant, diversified type sewage plants, and small and middle plants. Therefore, there is a problem that the system of Patent Document 2 and Non-Patent Document 3 cannot cope with a size increase of the system in a case where the necessary water production quantity is large or the sewage/drainage quantity is small.

Patent Documents

Patent Document 1: International Publication WO 2010-61879
Patent Document 2: Japanese Patent No. 3957081

Non-Patent Documents

Non-Patent Document 1: "Kobelco Eco-Solutions Co., Ltd. and Four Others Conduct Demonstration Experiment of Model Project Launched by Ministry of Economy, Trade and Industry in Shunan-shi", [online], Mar. 5, 2009, Nihon Suido Shinbun, [searched for on Jul. 2, 2009], via the Internet <URL: http://www.suido-gesuido.co.jp/blog/suido/2009/03/post_2780.h tml>
Non-Patent Document 2: "Adoption of "Discover Technology Seeds Aiming at Low-Carbon Society/Social System Verification Model Project"", [online], Mar. 2, 2009, press release from Toray Industries, Inc. [searched for on Jul. 2, 2009], via the Internet <http://www.toray.co.jp/news/water/nr090302.html>
Non-Patent Document 3: IDA World Congress-Atlantis, The Palm-Dubai, UAE Nov. 7-12, 2009, PEF: IDAWC/DB09-033

SUMMARY OF THE INVENTION

The present invention provides a water producing system of utilizing composite water treatment technologies in which a plurality of membrane units using a semi-permeable membrane is arranged to produce fresh water from plural kinds of raw water, the water producing system being capable of ensuring a necessary water production quantity and coping with a size increase of the system while responding to change in a water intake quantity of raw water, and an operation method therefor.

The water producing system and the operation method therefor in the present invention have any of the following preferred configurations.

(1) A water producing system, at least including a semi-permeable membrane treatment process A, a semi-permeable membrane treatment process B, and a semi-permeable membrane treatment process C, wherein the semi-permeable membrane treatment process A includes a semi-permeable membrane treatment step A for subjecting treatment target water A to semi-permeable membrane treatment to produce membrane permeate A and concentrate A, and a treatment target water A delivery means for delivering the treatment target water A to the semi-permeable membrane treatment step A, the semi-permeable membrane treatment process B includes a treatment target water B branching means for branching treatment target water B2 into two or more, a semi-permeable membrane treatment step B for subjecting the treatment target water B to the semi-permeable membrane treatment to produce membrane permeate B and concentrate B, and a first treatment target water B delivery means for delivering one of the treatment target water B branched by the treatment target water B branching means to the semi-permeable membrane treatment step B as treatment target water, and the semi-permeable membrane treatment process C includes a semi-permeable membrane treatment step C for subjecting treatment target water to the semi-permeable membrane treatment to produce membrane permeate C and concentrate C, a first water mixing means for mixing the other treatment target water B branched by the treatment target water B branching means with at least part of the concentrate A produced in the semi-permeable membrane treatment step A, a mixed water delivery means for delivering the mixed water by the first water mixing means to the semi-permeable membrane treatment step C as treatment target water, and a second treatment target water B delivery means for delivering the other treatment target water B branched by the treatment target water B branching means to the first water mixing means as treatment target water.

(2) The water producing system according to (1), wherein the semi-permeable membrane treatment step B and the semi-permeable membrane treatment step C are respectively provided with one or more semi-permeable membrane treatment device, at least one semi-permeable membrane treatment device selected from a group of the semi-permeable membrane treatment devices of the semi-permeable membrane treatment step B and the semi-permeable membrane treatment step C is a semi-permeable membrane treatment device X for subjecting both the treatment target water B and the mixed water to the semi-permeable membrane treatment, and the water producing system includes a treatment target water switching means for switching the treatment target water to be delivered to the semi-permeable membrane treatment device X in such a manner that both the treatment target water B and the mixed water are deliverable to the semi-permeable membrane treatment device X.

(3) The water producing system according to (2), wherein the semi-permeable membrane treatment device X subjects only one of the treatment target water B and the mixed water to the semi-permeable membrane treatment at one time.

(4) The water producing system according to (2) or (3), wherein the semi-permeable membrane treatment device X communicates with both the delivery means of the first treatment target water B delivery means and the mixed water delivery means.

(5) The water producing system according to any of (2) to (4), wherein at least one delivery means selected from a group consisting of the first treatment target water B delivery means and the mixed water delivery means is a delivery means Y capable of delivering both the treatment target water B and the mixed water.

(6) The water producing system according to (5), wherein the delivery means Y delivers one of the treatment target water B and the mixed water at one time.

(7) The water producing system according to any of (1) to (6), including a second water mixing means for mixing the treatment target water A with the concentrate A or the treatment target water B or the mixed water, and a treatment target water A bypass delivery means for delivering the treatment target water A to the second water mixing means.

(8) The water producing system according to (7), wherein the first water mixing means and the second water mixing means are the same water mixing means.

(9) The water producing system according to any of (1) to (8), including a biological treatment device for subjecting organic component contained water to biological treatment to obtain biological treatment water, and a membrane treatment device A for subjecting the biological treatment water to treatment with a microfiltration membrane or an ultrafiltration membrane to obtain membrane treatment water A, wherein the membrane treatment water A serves as the treatment target water A.

(10) The water producing system according to any of (1) to (9), including a water intake means for taking in salt contained water, and a membrane treatment device B for subjecting the salt contained water taken in by the water intake means to the treatment with the microfiltration membrane or the ultrafiltration membrane to obtain membrane treatment water B, wherein the membrane treatment water B serves as the treatment target water B.

(11) The water producing system according to (10), including a membrane treatment water B storage reservoir that stores the membrane treatment water B, a first membrane treatment water B delivery means for delivering the membrane treatment water B to the membrane treatment water B storage reservoir, a mixed water storage reservoir that stores the mixed water, a second membrane treatment water B delivery means for delivering the membrane treatment water B of the membrane treatment water B storage reservoir to the mixed water storage reservoir, and a concentrate A delivery means for delivering the concentrate A to the mixed water storage reservoir, wherein the first treatment target water B delivery means is a delivery means for delivering the membrane treatment water B stored in the membrane treatment water B storage reservoir to the semi-permeable membrane treatment step B, and the mixed water delivery means is a delivery means for delivering the mixed water stored in the mixed water storage reservoir to the semi-permeable membrane treatment step C.

(12) An operation method for a water producing system, wherein in the water producing system according to any of (2) to (11) including a first flow rate measuring means for measuring a flow rate of the treatment target water A or the concentrate A, the treatment target water of one or more semi-permeable membrane treatment device X is switched by the treatment target water switching means based on a measured value of the first flow rate measuring means.

(13) An operation method for a water producing system, wherein in the water producing system according to any of (2) to (11), based on a predetermined value of an accumulated membrane permeate quantity or a predetermined value of a treatment time of one or more semi-permeable membrane treatment device X, the treatment target water of the semi-permeable membrane treatment device X is switched.

(14) An operation method for a water producing system, wherein in the water producing system according to any of (7) to (11) including a second flow rate measuring means for measuring a flow rate of the treatment target water A delivered by the treatment target water A bypass delivery means, the treatment target water of one or more semi-permeable membrane treatment device X is switched by the treatment target water switching means based on a measured value of the second flow rate measuring means.

(15) A water producing system, including a semi-permeable membrane treatment device for subjecting a plurality of different kinds of treatment target water to semi-permeable membrane treatment, and a treatment target water switching means for delivering the treatment target water to the semi-permeable membrane treatment device, wherein the semi-permeable membrane treatment device is formed by a plurality of semi-permeable membrane treatment devices arranged side by side, and the water producing system includes a treatment target water switching means for switching the treatment target water to be delivered to a semi-permeable membrane treatment device X in such a manner that one or more semi-permeable membrane treatment device selected from the plurality of semi-permeable membrane treatment devices serves as the semi-permeable membrane treatment device X for subjecting two or more kinds of treatment target water selected from the plurality of different kinds of treatment target water to the semi-permeable membrane treatment.

(16) The water producing system according to (15), wherein the semi-permeable membrane treatment device X subjects only one kind of the treatment target water selected from the plurality of different kinds of treatment target water to the semi-permeable membrane treatment at one time.

(17) The water producing system according to (15) or (16), wherein the semi-permeable membrane treatment device X communicates with a plurality of treatment target water delivery means.

(18) The water producing system according to any of (15) to (17), wherein one or more treatment target water delivery means serves as a treatment target water delivery means for delivering plural kinds of treatment target water to the semi-permeable membrane treatment device X by switching the kind of the treatment target water to be delivered by the treatment target water switching means.

(19) An operation method for a water producing system, wherein in the water producing system according to any of (15) to (18) including a flow rate measuring means for measuring a flow rate of one kind of treatment target water selected from the plurality of different kinds of treatment target water, the kind of the treatment target water to be delivered to one or more system of the semi-permeable membrane treatment device X is switched based on a measured value of the flow rate measuring means.

(20) An operation method for a water producing system, wherein in the water producing system according to any of (15) to (19), based on a predetermined value of an accumulated membrane permeate quantity or a predetermined value of a treatment time of one or more system of the semi-permeable membrane treatment device X, the kind of the treatment target water to be delivered to the semi-permeable membrane treatment device X is switched by the treatment target water delivery means.

Effects obtained by the present invention may include as follows.

The invention preferably includes the semi-permeable membrane treatment process A for subjecting the treatment target water A to the semi-permeable membrane treatment, the semi-permeable membrane treatment process B for subjecting the treatment target water B to the semi-permeable membrane treatment, and the semi-permeable membrane treatment process C for subjecting the mixed water in which part of the concentrate A and part of the treatment target water B are mixed to the semi-permeable membrane treatment. Thus, for example, in a case where the treatment target water A is sewage/drainage and the treatment target water B is salt contained water such as brackish water and seawater, the semi-permeable membrane treatment step B for performing seawater desalination is designed to treat an insufficient amount of a necessary product water quantity for the entire system, the amount not covered by a total treatment water quantity produced from the semi-permeable membrane treatment step A and the semi-permeable membrane treatment step C, or an amount assumed to be insufficient. By increasing and decreasing a treatment water quantity of the semi-permeable membrane treatment step B in response to change in a sewage/drainage intake quantity, the necessary product water quantity can be ensured. At least, at the time of stopping supply of the treatment target water A and stopping the semi-permeable membrane treatment step A, a minimum quantity of product water can be obtained by the semi-permeable membrane treatment step B. In a case where the sewage/drainage intake quantity is small, the semi-permeable membrane treatment step B for performing the seawater desalination is designed to be large, so that the system becomes a large-sized water producing system.

Since sewage/drainage has lower osmotic pressure than seawater, a sewage/drainage semi-permeable membrane treatment process can be operated with lower energy than a seawater semi-permeable membrane treatment process. Therefore, the sewage/drainage semi-permeable membrane treatment process is desirably operated at as a high collection rate as possible. However, the higher the collection rate is, the less the generated concentrate is. In a conventional water producing system as in Patent Document 1, Non-Patent Document 1, Non-Patent Document 2, little concentrate is generated. In a case where the necessary product water quantity is large, a necessary quantity of mixed water is produced by mixing a lot of seawater with the concentrate, and the mixed water is subjected to semi-permeable membrane treatment, so that the product water quantity is obtained. Dirty components such as organic matters are condensed in concentrate derived from sewage/drainage. Thus, membrane clogging and biofouling are generated more often in the mixed water than seawater, so that there is a possibility that agent cleaning has to be frequently performed. In the water producing system, the concentrate and seawater are mixed within a range that an energy-saving effect due to a dilution effect is generated, the mixed water is subjected to the semi-permeable membrane treatment in the semi-permeable membrane treatment step C, and the remaining seawater is subjected to the semi-permeable membrane treatment in the semi-permeable membrane treatment step B. Thus, feed water containing the concentrate derived from sewage/drainage is reduced more than the conventional water producing system, and the number of performing the agent cleaning against the membrane clogging and the biofouling is reduced for an amount of seawater supplied to the semi-permeable membrane treatment step B. Further, in a case where the necessary product water quantity is decreased, by decreasing the treatment water quantity of the semi-permeable membrane treatment step B for performing the seawater desalination, the step requiring large power for a booster pump, the product water quantity can be adjusted.

The plural systems of semi-permeable membrane treatment devices arranged side by side are preferably provided, and the treatment target water B and the mixed water can be appropriately selected or mixed by the treatment target water switching means and subjected to the semi-permeable membrane treatment. Therefore, for example, in a case where the treatment target water A is sewage/drainage and the treatment target water B is salt contained water such as brackish water or seawater, and in a case where a water quantity of the treatment target water A is large and a water quantity of the concentrate A is large, the mixed water is increased. Thus, by the treatment target water switching means, a treatment water quantity in an energy-saving mixed water semi-permeable membrane treatment process is more increased, so that the seawater semi-permeable membrane treatment process requiring a lot of energy can be reduced. In a case where the water quantity of the treatment target water A is small, the mixed water is reduced. Thus, by increasing a water intake quantity of the treatment target water B, and increasing the treatment water quantity of the treatment target water B by the treatment target water switching means, that is, increasing the seawater semi-permeable membrane treatment process, the necessary product water quantity can be ensured. Even in a case where the necessary product water quantity is unchanged or the water quantity of the treatment target water A is hardly changed, by regularly switching a treatment ratio of the treatment target water B and the mixed water by the treatment target water switching means, a load applied to a semi-permeable membrane due to differences between the treatment target water B and the mixed water in terms of water qualities such as a salt concentration and a membrane contaminant concentration is uniformized, contributing to extension of the life of the membrane and simplification of maintenance such as membrane replacement and agent cleaning. Thus, treatment cost and treatment energy are reduced.

The treatment target water A bypass delivery means for mixing the treatment target water A with the concentrate A or the treatment target water B or the mixed water is preferably provided. Thus, for example, even in a case where a problem is generated in the semi-permeable membrane treatment device A and hence the semi-permeable membrane treatment cannot be performed, or in a case where a flow rate of the treatment target water A is increased, by mixing the treatment target water A with raw water of the semi-permeable membrane treatment step B or the semi-permeable membrane treatment step C to lower the salt concentration and supplying the treatment target water A, pressure of the booster pump is reduced, so that energy is saved.

In a case where the treatment target water A is water generated from organic component contained water, and when the treatment target water is subjected to treatment with a MF/UF membrane after the biological treatment, an influence of organic components over the semi-permeable membrane is preferably reduced, so that a stable operation can be performed.

In a case where the treatment target water B is water generated from salt contained water, and when the treatment target water is subjected to the treatment with the MF/UF membrane after water intake, suspended matters and organic components are preferably removed, so that a stable operation can be performed for a semi-permeable membrane at the later stage.

The membrane treatment water B storage reservoir and the mixed water storage reservoir are preferably provided. Thus, even when the membrane treatment water B cannot be obtained temporarily, for example, at the time of a cleaning step of the MF/UF membrane, the membrane treatment water B stored in the membrane treatment water B storage reservoir can always be delivered to the mixed water storage reservoir and the semi-permeable membrane treatment device B. Even in a case where steps on the upstream side of the mixed water storage reservoir such as the semi-permeable membrane treatment device A is stopped, or the like, and hence the concentrate A cannot be obtained temporarily, the mixed water can be supplied to the semi-permeable membrane treatment step C. A mixing ratio of the treatment target water B and the concentrate A can be precisely adjusted.

By measuring the flow rate of the treatment target water A or the concentrate A, or the accumulated membrane permeate quantity or the treatment time of the semi-permeable membrane treatment device X, and automatically switching the treatment target water to be delivered to the semi-permeable membrane treatment device X by the measured value, the life of the semi-permeable membrane treatment device can be reasonably extended, and operation management can be easily performed.

The plural systems of semi-permeable membrane treatment devices arranged side by side are preferably provided, and the treatment target water A and the treatment target water B can be appropriately selected or mixed by the treatment target water switching means and subjected to the semi-permeable membrane treatment. Since sewage/drainage has lower osmotic pressure than seawater, the sewage/drainage semi-permeable membrane treatment process can be operated with lower energy than the seawater semi-permeable membrane treatment process. Thus, for example, in a case where the treatment target water A is sewage/drainage and the treatment target water B is salt contained water such as brackish water or seawater, and in a case where the water quantity of the treatment target water A is large, the treatment water quantity in the energy-saving sewage/drainage semi-permeable membrane treatment process is more increased by the treatment target water switching means, so that the seawater semi-permeable membrane treatment process requiring a lot of energy can be reduced. In a case where the water quantity of the treatment target water A is small, by increasing the water intake quantity of the treatment target water B, and increasing the treatment water quantity of the treatment target water B by the treatment target water switching means, that is, increasing the seawater semi-permeable membrane treatment process, the necessary product water quantity can be ensured. Even in a case where the necessary product water quantity is unchanged or the water quantity of the treatment target water A is hardly changed, by regularly switching a treatment ratio of the treatment target water A and the treatment target water B by the treatment target water switching means, a load applied to the semi-permeable membrane due to differences between the treatment target water A and the treatment target water B in terms of water qualities such as a salt concentration and a membrane contaminant concentration is uniformized, contributing to extension of the life of the membrane and simplification of maintenance such as membrane replacement and agent cleaning. Thus, treatment cost and treatment energy are reduced.

The semi-permeable membrane treatment device X can optionally subject only one kind of treatment target water selected from the plurality of different kinds of treatment target water to the semi-permeable membrane treatment at one time. Thus, for example, in a case where one treatment target water is not supplied due to failure or maintenance of a pre-treatment device, exhaustion of a raw water source, or the like, by subjecting only other treatment target water to the semi-permeable membrane treatment, the necessary product water quantity can be surely obtained.

By providing communication between the semi-permeable membrane treatment device X and the plurality of treatment target water delivery means, without considering a switching route of the treatment target water, the treatment target water can be easily switched to the respective semi-permeable membrane treatment devices.

The treatment target water delivery means for supplying the treatment target water to the respective semi-permeable membrane or the semi-permeable membrane unit is preferably provided, and the kind of the treatment target water to be supplied to the treatment target water delivery means is switched by the treatment target water switching means. Since the treatment target water delivery means does not communicate with other semi-permeable membranes or semi-permeable membrane units, a flow rate, a collection rate, and pressure suitable for the respective semi-permeable membrane or the semi-permeable membrane unit can be easily controlled by the treatment target water delivery means. In a case where the system is stopped due to maintenance or the system is stopped at the abnormal time, the system can be easily stopped by stopping the treatment target water delivery means.

The flow rate of the treatment target water having low osmotic pressure from the plurality of different kinds of treatment target water is preferably measured, and in a case where the measured value of the flow rate becomes large, by increasing a delivery quantity of the treatment target water having low osmotic pressure to the semi-permeable membrane treatment device X by the treatment target water switching means, and reducing delivery of other treatment target water having high osmotic pressure, treatment energy is more reduced.

The kind of the treatment target water to be delivered to the semi-permeable membrane treatment device X is preferably switched by the treatment target water switching means based on the predetermined value of the accumulated membrane permeate quantity or the predetermined value of the treatment time of the semi-permeable membrane treatment device X, the treatment ratio of the treatment target water A and the treatment target water B is regularly switched. Thus, the load applied to the semi-permeable membrane due to differences between the treatment target water A and the treatment target water B in terms of water qualities such as a salt concentration and a membrane contaminant concentration is uniformized, contributing to extension of the life of the membrane and simplification of maintenance such as membrane replacement and agent cleaning. Therefore, treatment cost and treatment energy are reduced.

DETAILED DESCRIPTION OF THE INVENTION

In the following, with reference to the drawings, a description will be given of desirable embodiments of the present invention. It is to be noted that, the scope of the present invention is not limited thereto.

Figure 1:
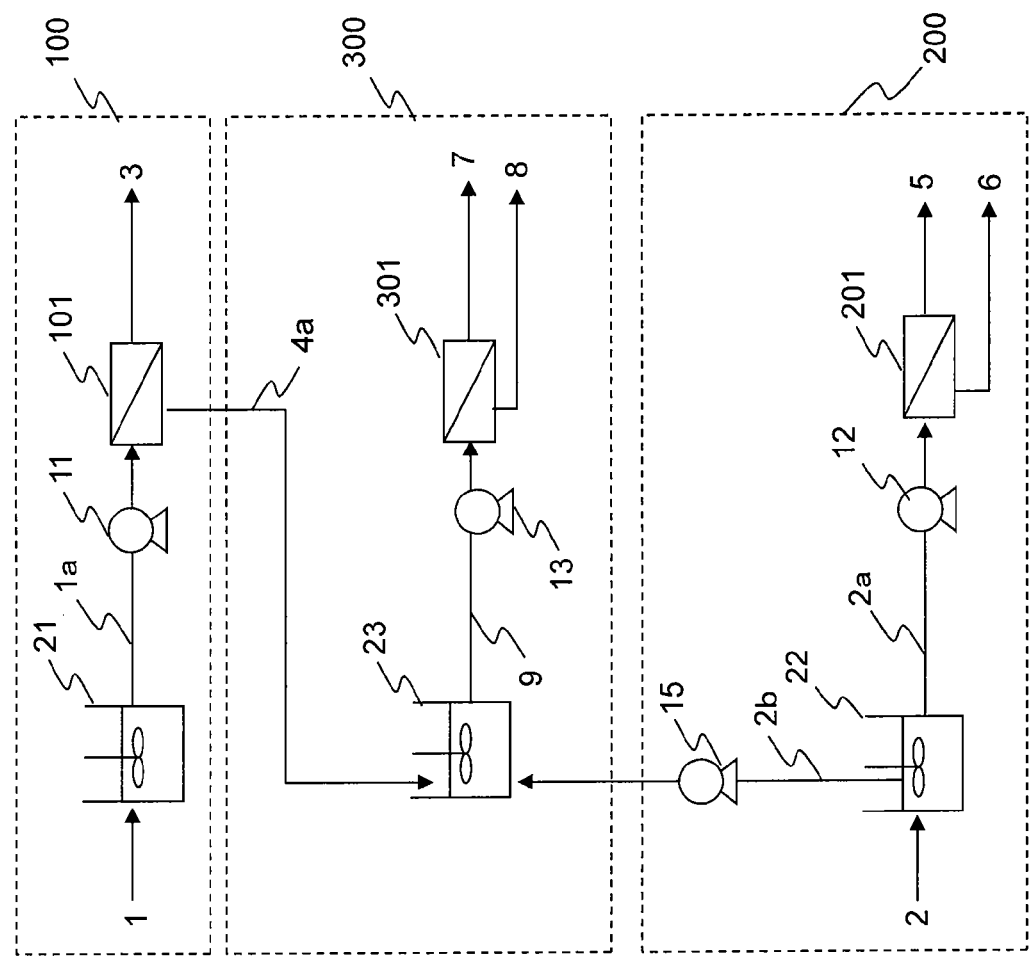
FIG. 1 is a flow diagram of one embodiment of a water producing system of the present invention.

FIG. 1 is a flow diagram of one embodiment of a water producing system to which the present invention is applied. The water producing system is provided with a semi-permeable membrane treatment process A100 for subjecting treatment target water A1 to semi-permeable membrane treatment in a semi-permeable membrane treatment device A101, a semi-permeable membrane treatment process B200 for subjecting treatment target water B2 to the semi-permeable membrane treatment in a semi-permeable membrane treatment device B201, and a semi-permeable membrane treatment process C300 for subjecting mixed water to the semi-permeable membrane treatment in a semi-permeable membrane treatment device C301.

The semi-permeable membrane treatment process A100 includes a treatment target water A reservoir 21 accommodating the treatment target water A1, a treatment target water A delivery pipe 1a for supplying the treatment target water A1 to the semi-permeable membrane treatment device A101, a booster pump 11 installed in the treatment target water A delivery pipe 1a, the booster pump for supplying the treatment target water A1 from the treatment target water A reservoir 21 to the semi-permeable membrane treatment device A101, and the semi-permeable membrane treatment device A101 for subjecting the treatment target water A1 to the semi-permeable membrane treatment.

The semi-permeable membrane treatment process B200 includes a treatment target water B reservoir 22 accommodating the treatment target water B2, a treatment target water B delivery pipe 2a for supplying the treatment target water B2 to the semi-permeable membrane treatment device B201, a booster pump 12 installed in the treatment target water B delivery pipe 2a, the booster pump for supplying the treatment target water B2 to the semi-permeable membrane treatment device B201, the semi-permeable membrane treatment device B201 for subjecting the treatment target water B2 to the semi-permeable membrane treatment, a treatment target water B delivery pipe 2b for supplying the treatment target water B2 from the treatment target water B reservoir 22 to a mixed water reservoir 23, and a pump 15 installed in the treatment target water B delivery pipe 2b, the pump being for supplying the treatment target water B2 to the mixed water reservoir 23.

The semi-permeable membrane treatment process C300 includes a concentrate A delivery pipe 4a communicating with the primary side (side of the treatment target water) of the semi-permeable membrane treatment device A101 for supplying concentrate A of the semi-permeable membrane treatment device A101 to the mixed water reservoir 23, the mixed water reservoir 23 communicating with the treatment target water B delivery pipe 2b and the concentrate A delivery pipe 4a for making the mixed water in which the treatment target water B2 and the concentrate A are mixed, a mixed water delivery pipe 9 for supplying the mixed water to the semi-permeable membrane treatment device C301, a booster pump 13 installed in the mixed water delivery pipe 9, the booster pump being for supplying the mixed water to the semi-permeable membrane treatment device C301, and the semi-permeable membrane treatment device C301 for subjecting the mixed water to the semi-permeable membrane treatment.

Obtained membrane permeate A3, membrane permeate B5, and membrane permeate C7 can be accommodated in a membrane permeate reservoir, and then discharged out of the system or reclaimed for industrial water, landscaping water, agricultural water, or the like.

The treatment target water A1 indicates feed water to be supplied to the semi-permeable membrane treatment device A101. Properties and components of the treatment target water A1 are not particularly limited. For example, sewage, plant drainage, seawater, brackish water, lake water, river water, groundwater, and the like are used. Alternatively, the raw water described above may be subjected to biological and/or physical and/or chemical pre-treatment such as activated sludge treatment, prefiltering, microfiltration membrane treatment, ultrafiltration membrane treatment, activated carbon treatment, ozonation, and ultraviolet irradiation treatment, to serve as the treatment target water A1, so that fouling generated in the semi-permeable membrane treatment device A101 is reduced.

The same is applied to properties and components of the treatment target water B2 as the treatment target water A1. However, when the raw water is combined in such a manner that osmotic pressure of the concentrate A and osmotic pressure of the treatment target water B satisfy the following relationship "(osmotic pressure of concentrate A)<(osmotic pressure of treatment target water B)", osmotic pressure of the mixed water serving as feed water to be supplied to the semi-permeable membrane treatment device C301 is lowered more than the treatment target water B2 in a semi-permeable membrane treatment step C, so that a booster level of the water to be supplied to the semi-permeable membrane treatment device C301 can be suppressed more than the treatment target water B2. Thereby, in comparison to water production respectively with the treatment target water A1 and the treatment target water B2, water production respectively with the treatment target water A1, the treatment target water B2, and the mixed water saves more energy and cost due to a decrease in a water production quantity with the treatment target water B2.

The osmotic pressure indicates pressure to be applied to the solution side to stop incoming of a solvent from the solvent side to the solution side when the solvent and a solution are brought into contact with each other with a semi-permeable membrane interposed therebetween. In an embodiment of the present invention, a difference between the osmotic pressure of the concentrate A and the osmotic pressure of the treatment target water B is important. Thus, by bringing the concentrate A and the treatment target water B into contact with each other with the semi-permeable membrane interposed therebetween, it can be determined that the osmotic pressure on the side where the pressure is applied to stop the incoming of the solvent is higher.

In order to obtain such a relationship of the osmotic pressure, raw water having lower osmotic pressure is used as the treatment target water A1, and raw water having higher osmotic pressure is used as the treatment target water B2. Preferably, water having a lower salt concentration is used as the raw water having lower osmotic pressure, and water having a higher salt concentration is used as the raw water having higher osmotic pressure. The water having a lower salt concentration generally includes sewage, industrial drainage, river water, or treatment water obtained by subjecting the water described above to the pre-treatment. The water having a higher salt concentration generally includes seawater, salt lake water, and brackish water. Specifically, an example includes a combination of secondary treatment water obtained by subjecting sewage/drainage to treatment with a membrane bioreactor as the treatment target water A1, and seawater as the treatment target water B.

In the middle of the various pipes described above, biological and/or physical and/or chemical treatment such as activated sludge treatment, prefiltering, microfiltration membrane treatment, ultrafiltration membrane treatment, activated carbon treatment, ozonation, ultraviolet irradiation treatment, and chemical liquid injection, an intermediate tank, or the like may be provided.

As long as the semi-permeable membrane treatment device A101, the semi-permeable membrane treatment device B201, and the semi-permeable membrane treatment device C301 have a function of separating into permeate and concentrate by a semi-permeable membrane provided in the device, shapes and materials thereof are not particularly limited. In a case where the raw water is water containing a lot of fouling substances such as sewage and industrial drainage, a low-fouling semi-permeable membrane is preferably used.

The semi-permeable membrane is a semi-permeable membrane that does not allow part of components in the treatment target water to permeate through. For example, the semi-permeable membrane includes a semi-permeable membrane that allows the solvent to permeate through and that does not allow a solute to permeate through. One example of the semi-permeable membrane used in water treatment technologies includes an NF membrane and an RO membrane. The NF membrane or the RO membrane is desired to possess the performance of being capable of reducing the concentration of the solute contained in the treatment target water to the level at which the solute can be used as reclaimed water. Specifically, it is desired to possess the performance of blocking various ions such as salt, mineral components and the like, e.g., divalent ions such as calcium ions, magnesium ions, and sulfate ions, the monovalent ions such as sodium ions, potassium ions, and chlorine ions, and dissoluble organic substances such as humic acid (molecular weight Mw 100,000), fulvic acid (molecular weight Mw=100 to 1,000), alcohol, ether, and sugars. The NF membrane is defined as an RO membrane whose operation pressure is equal to or smaller than 1.5 MPa, and whose molecular weight cutoff ranges from 200 to 1,000, and sodium chloride blocking rate is equal to or smaller than 90%. A membrane whose molecular weight cutoff is smaller than that and which possesses high blocking performance is referred to as the RO membrane. Further, of the RO membranes, one close to the NF membrane is referred also to as the loose RO membrane.

The NF membrane and the RO membrane can take forms of a hollow fiber membrane and a flat sheet membrane, to both of which the present invention can be applied. Further, in order to achieve easier handling, a fluid separation device (element) can be used, in which the hollow fiber membrane or the flat sheet membrane is stored in a casing. Preferably, the fluid separation device has the following structure in a case where the flat sheet membrane is used as the NF membrane or the RO membrane: a membrane unit, including the permeate flow channel member made up of the NF membrane or the RO membrane and tricot and a feed water flow channel member such as a plastic net, is wrapped around a cylindrical center pipe to which a multitude of pores are bored, which is then entirely stored in a cylindrical casing. It is also preferable to connect a plurality of fluid separation devices in series or in parallel so as to form a separation membrane module. In this fluid separation device, the feed water is supplied from one end into the unit, and before the feed water reaches the other end, the permeate permeating through the NF membrane or the RO membrane flows into the center pipe, and taken out of the center pipe at the other end. On the other hand, the feed water that did not permeate through the NF membrane or the RO membrane is taken out as the concentrate at the other end.

As the membrane material for the NF membrane or the RO membrane, polymer materials such as cellulose acetate, cellulose-base polymer, polyamide, and vinyl polymer can be used. Representative NF/RO membranes may be a cellulose acetate-base or polyamide-base asymmetric membrane, and a composite membrane having a polyamide-base or polyurea-base active layer.

As long as the pipes of the treatment target water A delivery pipe 1a, the treatment target water B delivery pipe 2a, the treatment target water B delivery pipe 2b, the concentrate A delivery pipe 4a, and the mixed water delivery pipe 9 have a function of moving liquids, materials and shapes thereof are not particularly limited. However, the pipes preferably have resistance against properties of the liquids to be moved, properties of agents to be charged, and pressure to be applied.

The booster pump 11, the booster pump 12, and the booster pump 13 are pumps having a booster function for respectively applying the pressure to the treatment target water A1, the treatment target water B2, and the mixed water to respectively supply and separate the liquids to and in the semi-permeable membrane treatment device A101, the semi-permeable membrane treatment device B201, and the semi-permeable membrane treatment device C301. The booster pump 11, the booster pump 12, and the booster pump 13 respectively show one specific embodiment of a treatment target water A delivery means for delivering the treatment target water A1 to a semi-permeable membrane treatment step A, a first treatment target water B delivery means for delivering the treatment target water B2 to a semi-permeable membrane treatment step B, and a mixed water delivery means for delivering the mixed water to the semi-permeable membrane treatment step C. The means are not limited to the mode of the booster pump. Preferably, in a case where the osmotic pressure of the target water is low, a feed pump for applying the pressure by supplying the target water is installed, and in a case where the osmotic pressure of the target water is high, a pump for delivering the target water, and a booster pump for boosting the pressure of the target water and supplying the target water to the semi-permeable membrane treatment device to carry out membrane permeation are installed.

As long as a first water mixing means has a function of mixing the treatment target water B and the concentrate A, a method and a form thereof are not particularly limited. An example includes the method with the mixed water reservoir 23 described above, a method with a line mixer, and a method of utilizing a delivery pump. As long as the treatment target water A reservoir 21, the treatment target water B reservoir 22, and the mixed water reservoir 23 can store the mixed water and have resistance against deterioration due to a chemical liquid such as a disinfection agent and a neutralization agent, the reservoirs are not particularly limited and a concrete reservoir, a glass fiber reinforced plastic reservoir, a plastic reservoir, or the like is used. An agitator for agitation in the reservoir may be provided.

As long as a second treatment target water B delivery means for delivering the treatment target water B from the treatment target water B reservoir 22 to the mixed water reservoir 23 has a function of moving the treatment target water B from the treatment target water B reservoir 22 to the mixed water reservoir 23, a method and a form thereof are not particularly limited. An example includes the method with the pump 15 described above, a method using a head difference, and a method utilizing overflow.

Figure 2:
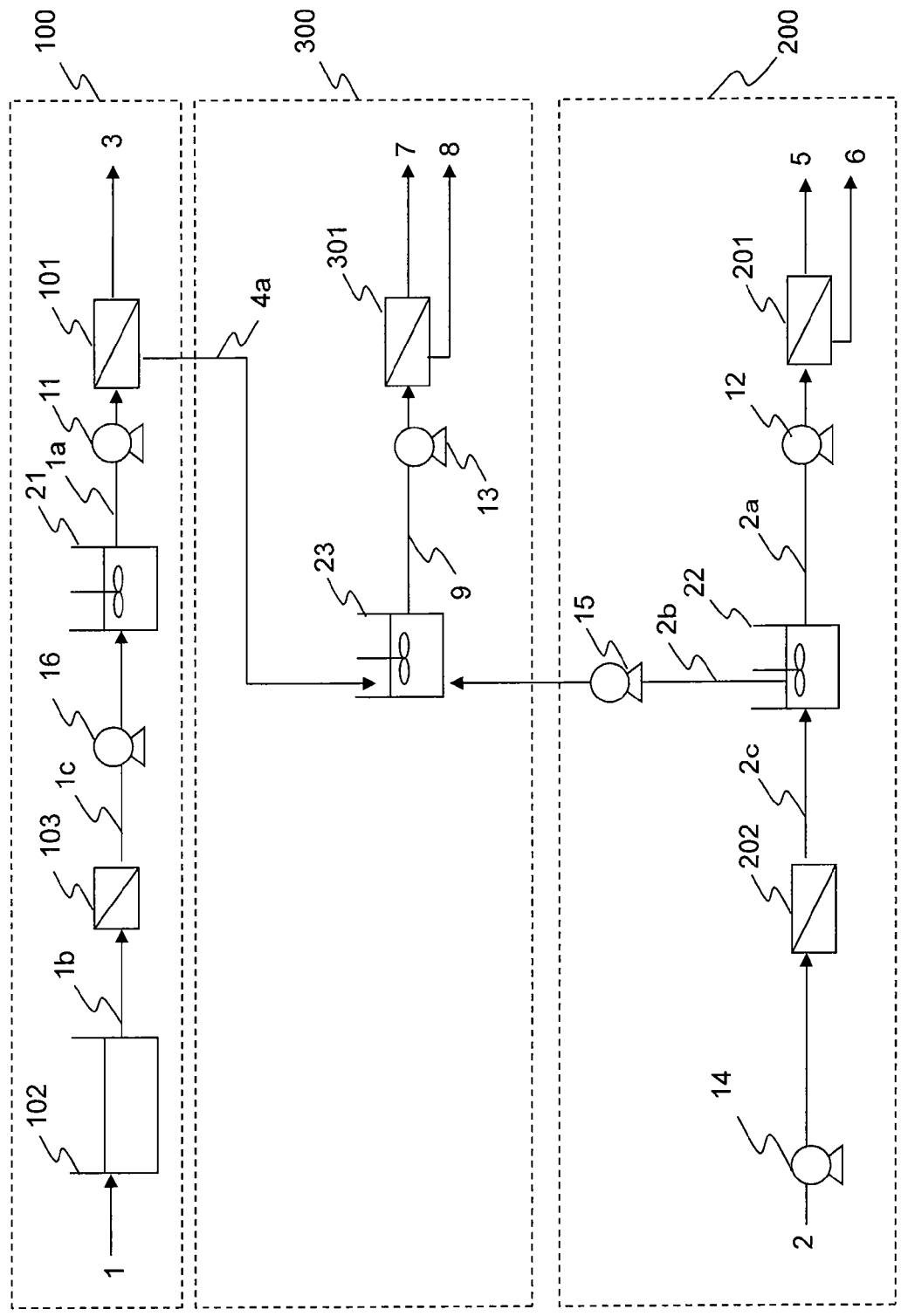
FIG. 2 is a flow diagram of another embodiment of the water producing system of the present invention.

In a case where water containing a lot of impurities is used as the raw water, as shown in FIG. 2, pre-treatment water obtained by removing the impurities in a pre-treatment plant is preferably used as the treatment target water A and the treatment target water B. In particular, as the pre-treatment plant, an activated sludge treatment plant, a two-step treatment plant of the activated sludge treatment and the microfiltration/ultrafiltration membrane (MF/UF membrane) or the sand filtration, a membrane bioreactor (MBR) plant, an MF/UF membrane filtration treatment plant, a sand filtration treatment plant, or the like can be used.

In FIG. 2, as the pre-treatment plant, the semi-permeable membrane treatment process A100 includes a biological treatment reservoir 102 for subjecting the treatment target water A1 to biological treatment, a biological treatment water deliver pipe 1b for supplying the biological treatment water subjected to the biological treatment in the biological treatment reservoir 102 to a separation membrane device 103, the separation membrane device 103 communicating with the biological treatment water deliver pipe 1b, a membrane treatment water A delivery pipe 1c communicating with the secondary side (side of the membrane permeate) of the separation membrane device 103, and a pump 16 installed in the membrane treatment water A delivery pipe 1c, the pump being for supplying the biological treatment water to the separation membrane device 103, and the semi-permeable membrane treatment process B200 includes a pump 14 for supplying the treatment target water B2 to a separation membrane device 202, the separation membrane device 202 for subjecting the treatment target water B2 to separation treatment, and a membrane treatment water B delivery pipe 2c communicating with the secondary side (side of the membrane permeate) of the separation membrane device 202. It should be noted that a reservoir for adjusting a flow rate may be provided at the former stage of the separation membrane device 103 and the separation membrane device 202.

The treatment target water A1 is a liquid containing substances serving as substrates of microorganisms in a liquid inside the biological treatment reservoir 102. For example, the treatment target water A1 includes organic drainage such as household drainage, urban sewage, and plant drainage. A means for supplying the treatment target water A1 to the biological treatment reservoir 102 may be a suction means for supplying the treatment target water from a treatment target water reservoir, a lake, or the like by a suction pump, or a means for supplying the treatment target water by utilizing a head difference between the treatment target water A1 and a liquid surface of the biological treatment reservoir. The separation membrane device 103 may be immersed in the liquid of the biological treatment reservoir 102 or installed out of the reservoir. A membrane separation method includes an immersed membrane method, an external membrane separation method, and a rotation flat sheet membrane method, and not particularly limited.

The treatment target water B2 is water containing organic matters to an extent that the biological treatment is not required but containing substances causing fouling on the semi-permeable membrane such as suspended matters and impurities. For example, the treatment target water includes water such as seawater, brackish water, and plant drainage. The suspended matters and the like are separated by the separation membrane device 202, so that fouling of the semi-permeable membrane treatment device 201 can be suppressed. Thus, the separation membrane device is preferably installed at the former stage of the semi-permeable membrane treatment device.

A membrane structure of the separation membrane device includes a porous membrane, and a composite membrane obtained by combining the porous membrane with a functional layer, but not particularly limited. A specific example of the membrane includes a porous membrane such as a polyacrylonitrile porous membrane, a polyimide porous membrane, a polyethersulfone porous membrane, a polyphenylene sulfide sulfone porous membrane, a polytetrafluoroethylene porous membrane, a polyvinylidene fluoride porous membrane, a polypropylene porous membrane, and a polyethylene porous membrane. However, the polyvinylidene fluoride porous membrane and the polytetrafluoroethylene porous membrane are particularly preferable due to high chemical resistance thereof. Further, the membrane structure includes a composite membrane obtained by combining the porous membrane described above with rubber copolymer such as cross-linked silicone, polybutadiene, polyacrylonitrile-butadiene, ethylene-propylene rubber, and neoprene rubber as the functional layer.

Membrane pore size of the separation membrane device is preferably pore size with which an activated sludge and suspended matter contained water can be separated into a solid component and a solution component. With large membrane pore size, although membrane permeability is improved, a possibility that the solid component is contained in the membrane treatment water tends to be high. Meanwhile, with small membrane pore size, although the possibility that the solid component is contained in the membrane treatment water is reduced, the membrane permeability tends to be lowered. Specifically, the pore size is preferably equal to or greater than 0.01 μm and equal to or smaller than 0.5 μm, and further preferably equal to or greater than 0.05 μm and equal to or smaller than 0.5 μm.

A mode of the separation membrane device includes a hollow fiber membrane, a tubular membrane, and a flat sheet membrane. However, any mode of membrane can be used in the present invention. The hollow fiber membrane is a circular tube separation membrane having an outer diameter which is less than 2 mm, and the tubular membrane is a circular tube separation membrane having an outer diameter which is equal to or greater than 2 mm. With respect to these separation membranes, in a case of the hollow fiber membrane, the hollow fiber membrane is bundled into a U shape or an I shape and accommodated in a case so as to be made into a hollow fiber membrane element. In a case of the tubular membrane, the membrane is made into a tubular element. In a case of the flat sheet membrane, the membrane is made into a spiral element or a plate-and-frame element. Preferably, the single element is used or the plurality of elements is combined and modularized.

Figure 3:
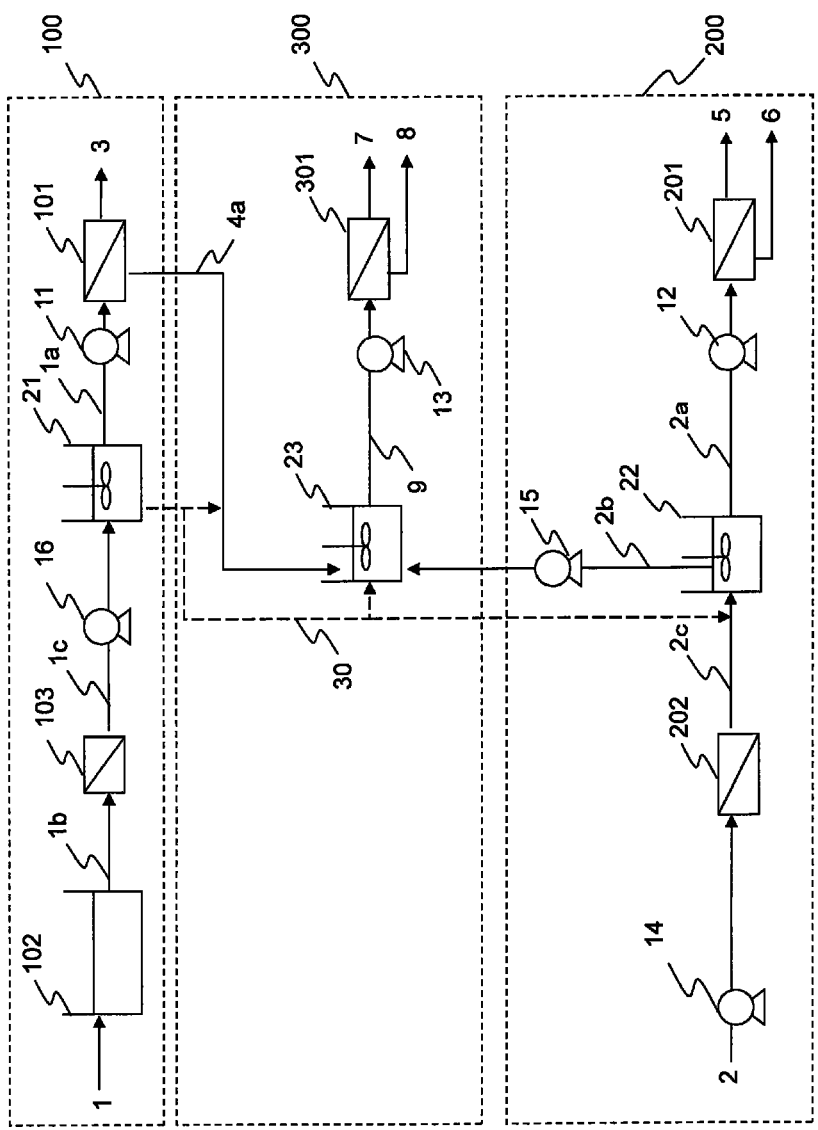
FIG. 3 is a flow diagram of still another embodiment of the water producing system of the present invention.

In a case where a problem is generated in the semi-permeable membrane treatment device A101 and hence the semi-permeable membrane treatment cannot be performed, the treatment target water A1 is preferably mixed with the raw water of the semi-permeable membrane treatment process B200 or the semi-permeable membrane treatment process C300 to lower the salt concentration and supplied to the semi-permeable membrane treatment device B201 or the semi-permeable membrane treatment device C301. A method and a form of a means for moving and mixing the treatment target water A1 with the concentrate A or the treatment target water B2 or the mixed water are not particularly limited. However, the treatment target water is only required to be mixed on the upstream of the semi-permeable membrane treatment device B201 or the semi-permeable membrane treatment device C301. As in FIG. 3, a treatment target water A bypass delivery pipe 30 is preferably provided so as to communicate with the treatment target water A reservoir 21 and the concentrate A delivery pipe, or to communicate with the treatment target water A reservoir 21 and the mixed water reservoir 23, or to communicate with the treatment target water A reservoir 21 and the membrane treatment water B delivery pipe 2c, or to communicate with the treatment target water A reservoir 21 and the treatment target water B reservoir 22, or to communicate with the treatment target water A reservoir 21 and the treatment target water B delivery pipe 2a, or to communicate with the treatment target water A reservoir 21 and the treatment target water B delivery pipe 2b. Preferably, a valve is provided in the treatment target water A bypass delivery pipe 30, and the valve is closed at the time of a normal operation and the valve is opened in a case where a problem is generated in the semi-permeable membrane treatment device A101. Preferably, automatic open/close control of the valve is control based on a concentrate A flow rate of the semi-permeable membrane treatment device A101 or control based on a signal at the time of stopping the semi-permeable membrane treatment device A101. An example of a means for delivering the treatment target water A1 from the treatment target water A reservoir 21 through the treatment target water A bypass delivery pipe 30 includes a method of installing an underwater pump in the treatment target water A reservoir 21, a method using a head difference, and a method utilizing overflow.

Here, the first water mixing means and a second water mixing means are the same, that is, the treatment target water A bypass delivery pipe 30 is provided so as to communicate with the treatment target water A reservoir 21 and the mixed water reservoir 23. This is preferable because the salt concentration supplied to the semi-permeable membrane treatment device B201 is not largely changed, so that there is no need for providing an inverter for changing supply pressure of the booster pump 12, and there is no confluence pressure loss in a pipe-joint part generated in a case of communicating with the pipe.

FIGS. 4 to 9 show examples of embodiments in which plural systems of semi-permeable membrane treatment devices arranged side by side are provided, and the treatment target water B and the mixed water can be appropriately selected or mixed by valves 40 and subjected to the semi-permeable membrane treatment.

Figure 4:
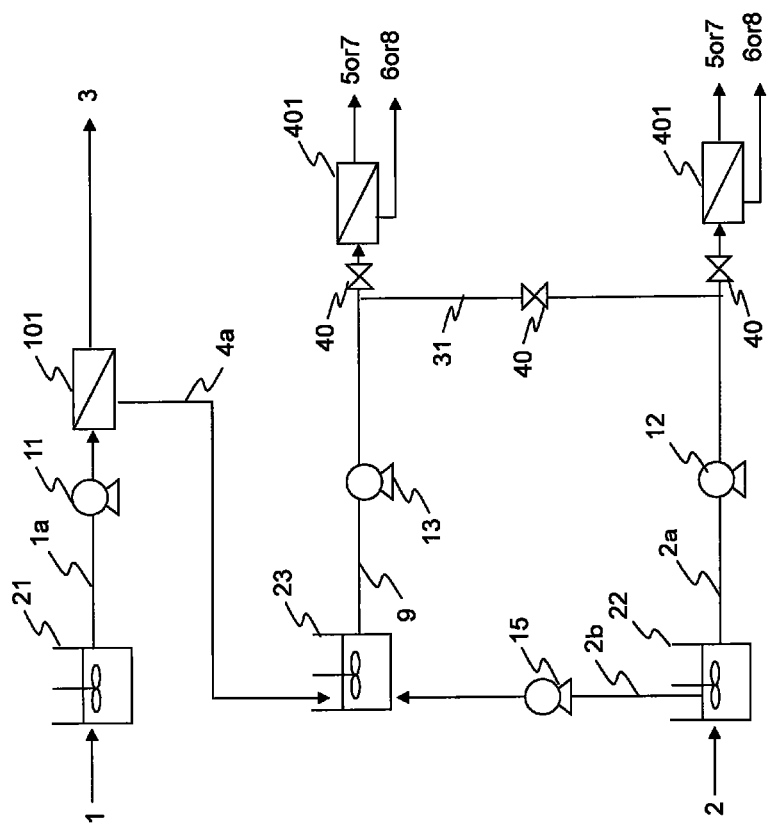
FIG. 4 is a flow diagram of yet another embodiment of the water producing system of the present invention.
Figure 5:
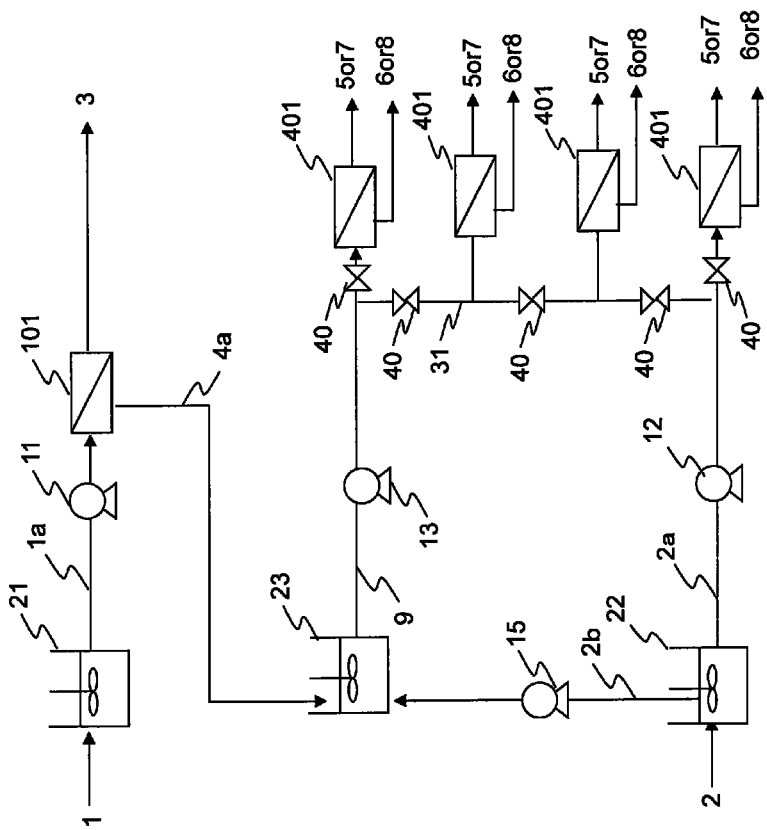
FIG. 5 is a flow diagram of yet another embodiment of the water producing system of the present invention.

In the embodiments shown in FIGS. 4, 5, a pipe 31 is provided so as to communicate with the treatment target water B delivery pipe 2a and the mixed water delivery pipe 9, and the valves 40 are provided in the pipe 31. By opening/closing the valves 40, semi-permeable membrane treatment devices X401 communicate with the mixed water delivery pipe 9 or the treatment target water B delivery pipe 2a or both the pipes of the mixed water delivery pipe 9 and the treatment target water B delivery pipe 2a through the pipe 31, so that the mixed water or the treatment target water B2 can be selectively subjected to the semi-permeable membrane treatment.

In a case where a mixed water quantity is decreased by a decrease in the treatment target water A1, stoppage of the semi-permeable membrane treatment device A101, a decrease in the concentrate A due to agent cleaning, or the like, by reducing the number of the semi-permeable membrane treatment devices for subjecting the mixed water to the semi-permeable membrane treatment or the number of units and controlling the valves 40 in such a manner that the treatment target water B2 is delivered to the above semi-permeable membrane treatment devices, a product water quantity can be ensured without decreasing to a large extent. Alternatively, by slightly or entirely opening the valves 40 serving as borders between the mixed water and the treatment target water B2, the treatment target water B2 to which higher pressure is applied due to higher osmotic pressure flows into the mixed water. Then, the treatment target water B is supplied to the mixed water while adjusting pressure and a flow rate by a degree of opening/closing of the valves 40, so that a necessary feed water quantity can be supplied to the semi-permeable membrane treatment devices communicating with the mixed water delivery pipe 9.

In a case where the mixed water quantity becomes zero, by stopping the booster pump 13 and controlling the valves 40 in such a manner that the treatment target water B2 is delivered to all the semi-permeable membrane treatment devices X401, the semi-permeable membrane treatment devices X401 are operated as the semi-permeable membrane treatment devices B. Thus, the product water quantity can be ensured without decreasing to a large extent.

In a case where the mixed water quantity is increased, by stopping the booster pump 12 and controlling the valves 40 in such a manner that all the semi-permeable membrane treatment devices X401 communicate with the mixed water delivery pipe 9, or by adjusting the booster pump 12 and controlling the valves 40 in such a manner that the semi-permeable membrane treatment devices X401 communicating with the mixed water delivery pipe 9 are increased, a treatment water quantity of the mixed water with which the semi-permeable membrane treatment can be performed at lower pressure than the treatment target water B2 is increased. Thus, energy and cost are saved.

Here, the semi-permeable membrane treatment devices X401 subject only one of the treatment target water B and the mixed water to the treatment at one time, that is, the valves 40 are controlled and operated in such a manner that the treatment target water B and the mixed water C are not mixed. This is preferable because liquid movement from the booster pump side where the supply pressure is higher to the side where the pressure is lower is reduced, so that an operation with stable osmotic pressure can be performed.

The pipe 31 is provided so as to provide communication between the treatment target water B delivery pipe 2a and the mixed water delivery pipe 9, and delivery pipes are installed so as to communicate with the respective semi-permeable membrane treatment devices from the pipe 31. This is preferable because the number of pipes and valves can be reduced more than a case where delivery pipes are installed so as to communicate with the respective semi-permeable membrane treatment devices from the treatment target water B delivery pipe 2a or the mixed water delivery pipe 9.

Figure 6:
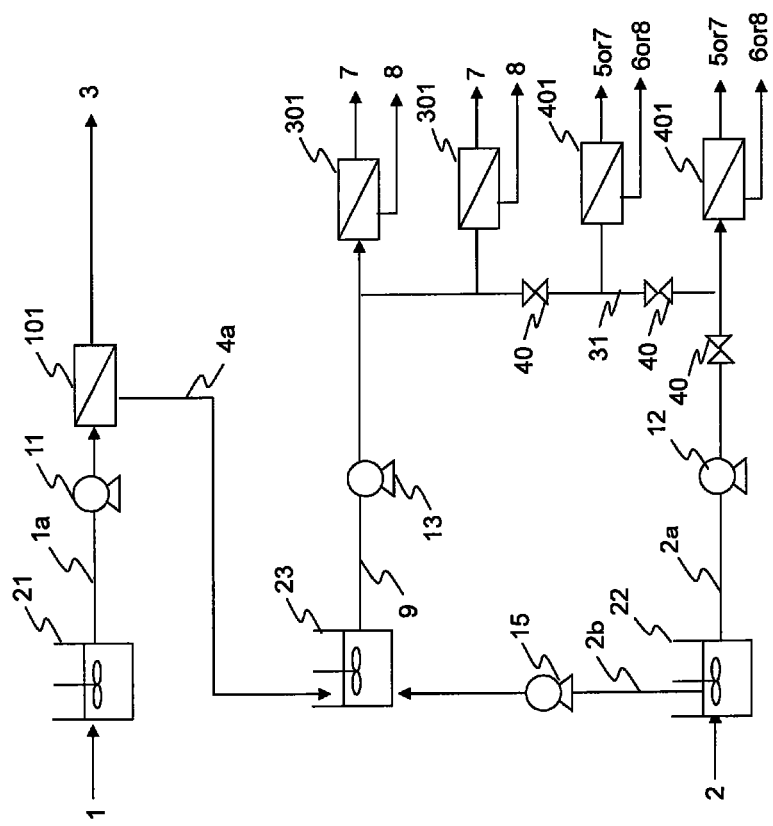
FIG. 6 is a flow diagram of yet another embodiment of the water producing system of the present invention.
Figure 7:
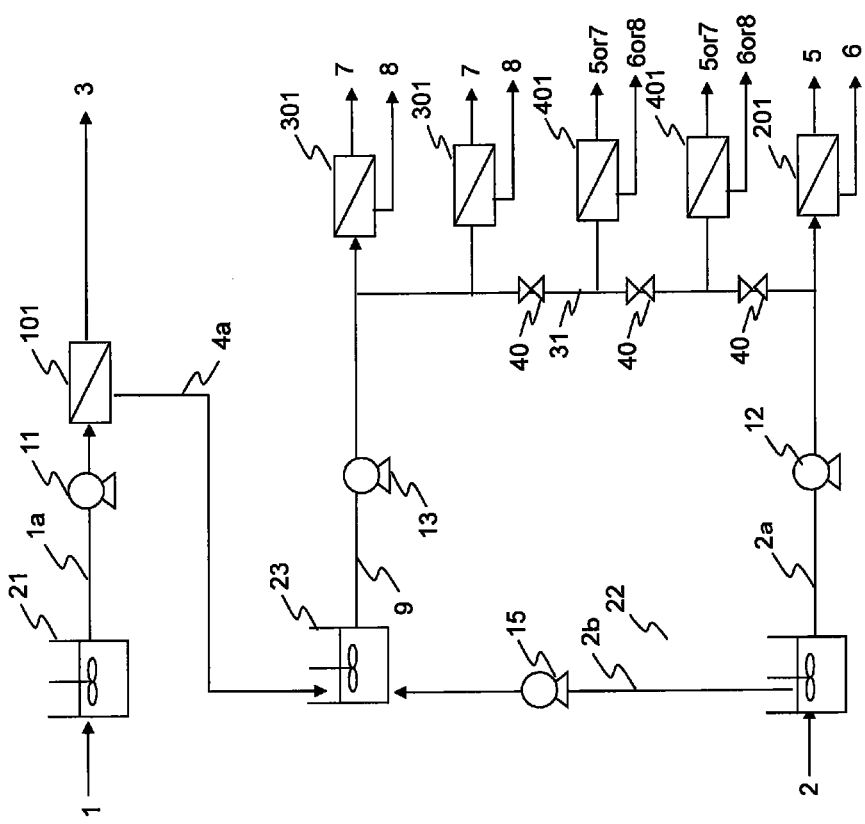
FIG. 7 is a flow diagram of yet another embodiment of the water producing system of the present invention.

As in embodiments shown in FIGS. 6, 7, the semi-permeable membrane treatment devices B and the semi-permeable membrane treatment devices C are installed so as to subject minimum water intake quantities of the treatment target water B and the mixed water to the semi-permeable membrane treatment. This is preferable because the number of valves is reduced.

Figure 8:
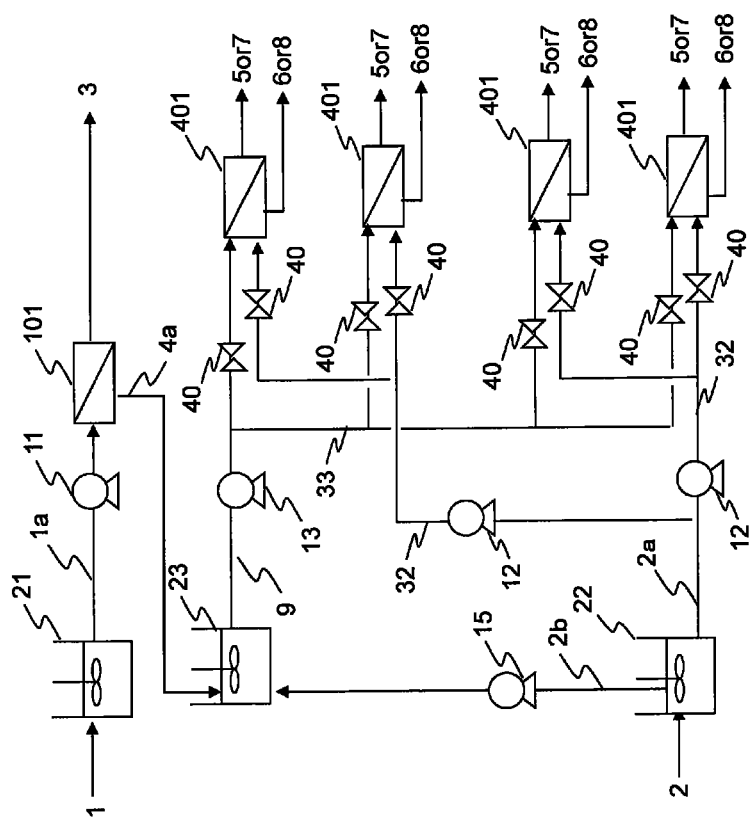
FIG. 8 is a flow diagram of yet another embodiment of the water producing system of the present invention.
Figure 9:
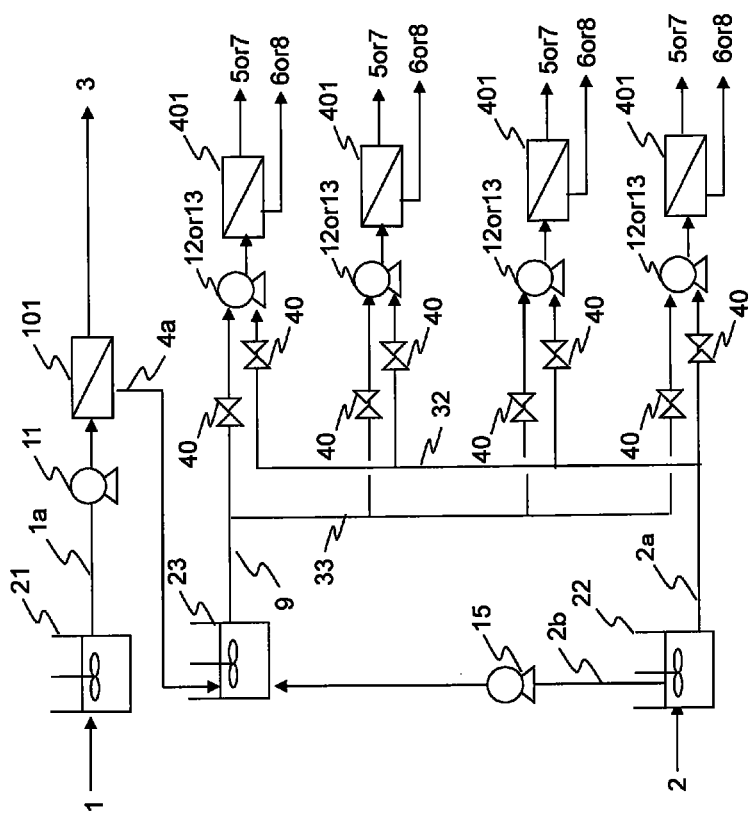
FIG. 9 is a flow diagram of yet another embodiment of the water producing system of the present invention.

In a case where there are a large number of semi-permeable membrane treatment devices in a large plant, as in embodiments shown in FIGS. 8, 9, the booster pump is installed for each of the semi-permeable membrane treatment device units or the semi-permeable membrane treatment devices. This is preferable because the pressure of each of the semi-permeable membrane treatment devices can be surely boosted, and the flow rate is easily adjusted.

The mixed water has a lower salt concentration than the treatment target water B. Thus, the delivery pipes of the mixed water and the treatment target water B are not the same as in FIG. 8. This is preferable because there is no need for providing highly corrosion-resistant pipes and valves on the side of the mixed water delivery pipe.

As in FIG. 9, the treatment target water is switched on the upstream side of the booster pumps, so that the number of pipes on the downstream side of the booster pumps is reduced. This is preferable because a region for high-pressure pipes on the downstream of the booster pumps can be reduced.

Types of the membranes of the semi-permeable membrane treatment devices X are the same. This is preferable because more flow rate changes can be responded, and alternatively, by switching the treatment target water, chemical fouling, biofouling, and the like due to differences of the salt concentration, pH, and the like can be suppressed.

Figure 10:
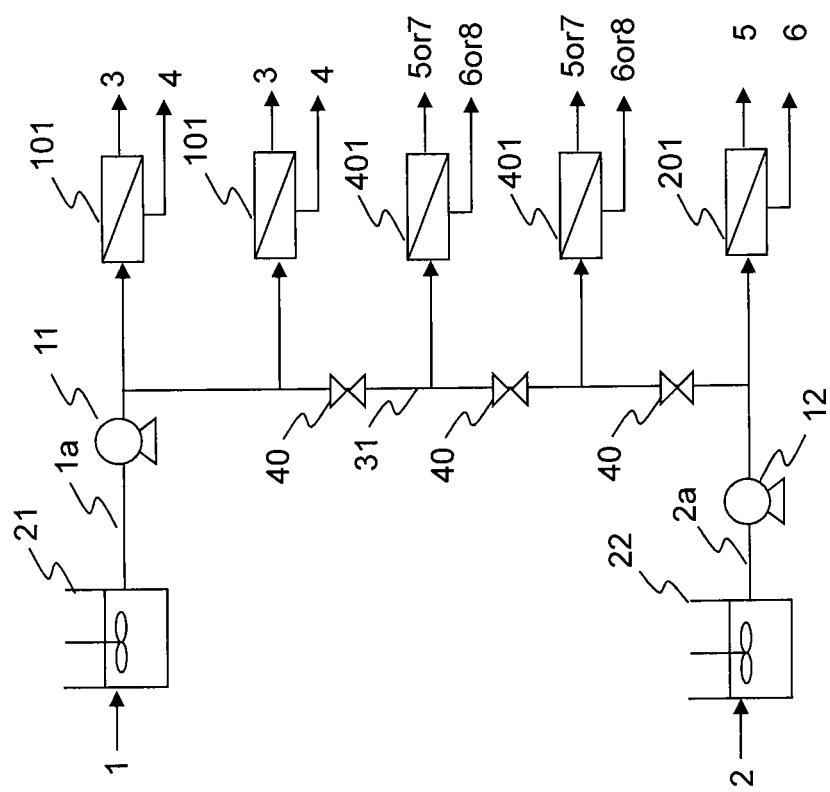
FIG. 10 is a flow diagram of yet another embodiment of the water producing system of the present invention.

FIG. 10 is a diagram showing a flow of yet another embodiment of the water producing system to which the present invention is applied. The water producing system includes the treatment target water A reservoir 21 accommodating the treatment target water A1, the treatment target water A delivery pipe 1a for supplying the treatment target water A1 to the semi-permeable membrane treatment devices, the booster pump 11 for supplying the treatment target water A1 from the treatment target water A reservoir 21 to the semi-permeable membrane treatment devices, the treatment target water B reservoir 22 accommodating the treatment target water B2, the treatment target water B delivery pipe 2a for supplying the treatment target water B2 to the semi-permeable membrane treatment devices, the booster pump 12 for supplying the treatment target water B2 from the treatment target water B reservoir 22 to the semi-permeable membrane treatment devices, the pipe 31 providing communication between the treatment target water A delivery pipe 1a and the treatment target water B delivery pipe 2a on the downstream side of the booster pump 11 and the booster pump 12, the valves 40 provided in the pipe 31 for changing the kind and the mixing ratio of the feed water to be supplied to the semi-permeable membrane treatment devices, the semi-permeable membrane treatment devices A101 for subjecting the treatment target water A1 to the semi-permeable membrane treatment, the semi-permeable membrane treatment device B201 for subjecting the treatment target water B2 to the semi-permeable membrane treatment, and the semi-permeable membrane treatment devices X401 for subjecting the treatment target water A1 or the treatment target water B2 or the mixed water of the treatment target water A1 and the treatment target water B2 to the semi-permeable membrane treatment.

By opening/closing the valves 40, the semi-permeable membrane treatment devices X401 communicate with the treatment target water A delivery pipe 1a or the treatment target water B delivery pipe 2a or both the pipes of the treatment target water A delivery pipe 1a and the treatment target water B delivery pipe 2a through the pipe 31, so that the treatment target water A1 or the treatment target water B2 or the mixed water of the treatment target water A1 and the treatment target water B2 can be selectively subjected to the semi-permeable membrane treatment.

In a case where the treatment target water A1 is decreased, by reducing the number of the semi-permeable membrane treatment devices for subjecting the treatment target water A1 to the semi-permeable membrane treatment or the number of the units and controlling the valves 40 in such a manner that the treatment target water B2 is delivered to the above semi-permeable membrane treatment devices, the product water quantity can be ensured without decreasing to a large extent. Alternatively, by slightly or entirely opening the valves 40 serving as borders between the treatment target water A1 and the treatment target water B2, the treatment target water B2 to which higher pressure is applied due to higher osmotic pressure flows into the treatment target water A1. Then, the treatment target water B2 is supplied to the treatment target water A1 while adjusting the pressure and the flow rate by the degree of opening/closing of the valves 40, so that the necessary feed water quantity can be supplied to the semi-permeable membrane treatment devices communicating with the treatment target water A delivery pipe 1a.

In a case where a treatment target water A1 quantity becomes zero, by stopping the booster pump 11 and controlling the valves 40 in such a manner that the treatment target water B2 is delivered to all the semi-permeable membrane treatment devices, all the semi-permeable membrane treatment devices are operated as the semi-permeable membrane treatment devices B. Thus, the product water quantity can be ensured without decreasing to a large extent.

In a case where the treatment target water A1 is increased, by stopping the booster pump 12 and controlling the valves 40 in such a manner that all the semi-permeable membrane treatment devices communicate with the treatment target water A delivery pipe 1a, or by adjusting the booster pump 12 and controlling the valves 40 in such a manner that the semi-permeable membrane treatment devices communicating with the treatment target water A delivery pipe 1a are increased, the treatment water quantity of the treatment target water A1 with which the semi-permeable membrane treatment can be performed at lower pressure than the treatment target water B2 is increased. Thus, the energy and the cost are saved.

Here, the semi-permeable membrane treatment devices subject only one of the treatment target water A1 and the treatment target water B2 to the treatment at one time, that is, the valves 40 are controlled and operated in such a manner that the treatment target water A1 and the treatment target water B2 are not mixed. This is preferable because the liquid movement from the booster pump side where the supply pressure is higher to the side where the pressure is lower is reduced, so that the operation with stable osmotic pressure can be performed.

The pipe 31 is provided so as to communicate with the treatment target water A delivery pipe 1a and the treatment target water B delivery pipe 2a, and delivery pipes are installed so as to communicate with the respective semi-permeable membrane treatment devices from the pipe 31. This is preferable because the number of pipes and valves can be reduced more than a case where delivery pipes are installed so as to communicate with the respective semi-permeable membrane treatment devices from the treatment target water A delivery pipe 1a or the treatment target water B delivery pipe 2a.

The semi-permeable membrane treatment devices A101 and the semi-permeable membrane treatment device B201 are installed so as to subject minimum water intake quantities of the treatment target water A1 and the treatment target water B2 to the semi-permeable membrane treatment. This is preferable because the number of valves is reduced.

Figure 11:
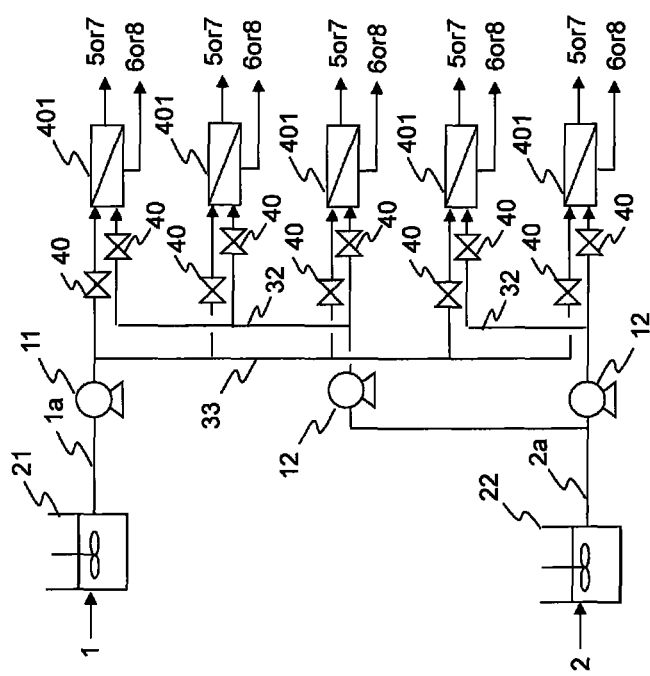
FIG. 11 is a flow diagram of yet another embodiment of the water producing system of the present invention.
Figure 12:
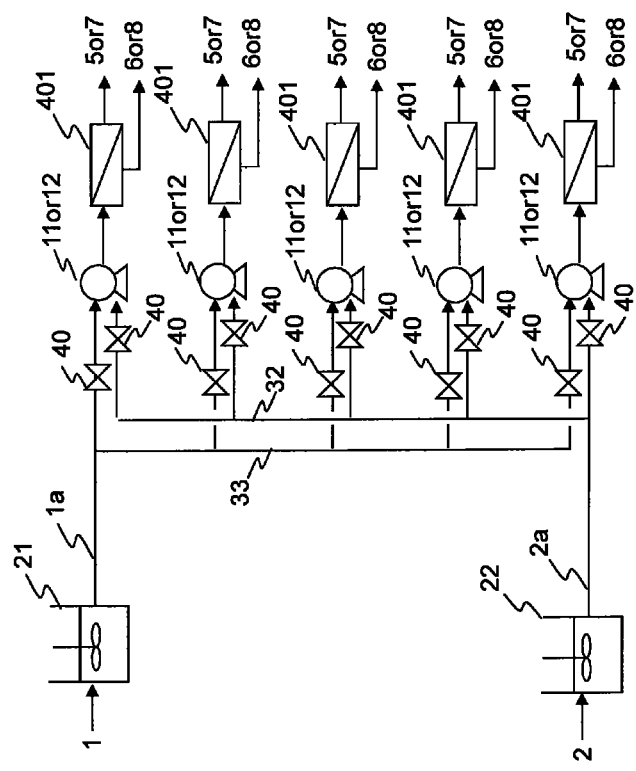
FIG. 12 is a flow diagram of yet another embodiment of the water producing system of the present invention.

In a case where there are a large number of semi-permeable membrane treatment devices in a large plant, as in embodiments shown in FIGS. 11, 12, the booster pump is installed for each of the semi-permeable membrane treatment device units or the semi-permeable membrane treatment devices. This is preferable because the pressure of each of the semi-permeable membrane treatment devices can be surely boosted, and the flow rate is easily adjusted.

The treatment target water A1 has a lower salt concentration than the treatment target water B2. Thus, the delivery pipes of the treatment target water A1 and the treatment target water B2 are not the same as in FIG. 11. This is preferable because there is no need for providing highly corrosion-resistant pipes and valves on the side of the treatment target water A delivery pipe.

As in FIG. 12, the treatment target water is switched on the upstream side of the booster pumps, so that the number of pipes on the downstream side of the booster pumps is reduced. This is preferable because a region for high-pressure pipes on the downstream of the booster pumps can be reduced.

Types of the membranes of the semi-permeable membrane treatment devices X are the same. This is preferable because more flow rate changes can be responded, and alternatively, by switching the treatment target water, chemical fouling, biofouling, and the like due to differences of the salt concentration, pH, and the like can be suppressed.

The present invention includes the water producing system using composite water treatment technologies in which a plurality of membrane units using a semi-permeable membrane is arranged, and an operation method therefor. A plurality of treatment target water A, B having different osmotic pressure such as sewage and seawater serves as raw water. The present invention can be favorably applied to a case where freshwater is produced by fresh water conversion technologies. In more detail, the present invention can be applied as a water producing device in the field of water clarification treatment in waterworks, the field of industrial-use water production such as industrial water, food and medical process water, and semiconductor-related component cleaning water, and fresh water can be produced in an energy saving and efficient manner.

DESCRIPTION OF REFERENCE CHARACTERS

1: treatment target water A
1a: treatment target water A delivery pipe
1b: biological treatment water deliver pipe
1c: membrane treatment water A delivery pipe
2: treatment target water B
2a: treatment target water B delivery pipe
2b: treatment target water B delivery pipe
2c: membrane treatment water B delivery pipe
3: membrane permeate A
4: concentrate A
4a: concentrate A delivery pipe
5: membrane permeate B
6: concentrate B
7: membrane permeate C
8: concentrate C
9: mixed water delivery pipe
11: booster pump
12: booster pump
13: booster pump
14: pump
15: pump
16: pump
21: treatment target water A reservoir
22: treatment target water B reservoir
23: mixed water reservoir
30: treatment target water A bypass delivery pipe
31: pipe
32: pipe
33: pipe
40: valve
100: semi-permeable membrane treatment process A
101: semi-permeable membrane treatment device A
102: biological treatment reservoir
103: separation membrane device
200: semi-permeable membrane treatment process B
201: semi-permeable membrane treatment device B
202: separation membrane device
300: semi-permeable membrane treatment process C
301: semi-permeable membrane treatment device C
401: semi-permeable membrane treatment device X

The invention claimed is:

1. A water producing system comprising:
a semi-permeable membrane treatment process A;
a semi-permeable membrane treatment process B; and
a semi-permeable membrane treatment process C,
wherein the semi-permeable membrane treatment process A includes a semi-permeable membrane treatment step A for subjecting treatment target water A to semi-permeable membrane treatment to produce membrane permeate A and concentrate A, and a treatment target water A delivery means for delivering the treatment target water A to the semi-permeable membrane treatment step A,
the semi-permeable membrane treatment process B includes a treatment target water B branching means for branching treatment target water B2 into two or more branches, a semi-permeable membrane treatment step B for subjecting the treatment target water B to the semi-permeable membrane treatment to produce membrane permeate B and concentrate B, and a first treatment target water B delivery means for delivering one of the treatment target water B branched by the treatment target water B branching means to the semi-permeable membrane treatment step B as treatment target water, and
the semi-permeable membrane treatment process C includes a semi-permeable membrane treatment step C for subjecting treatment target water to the semi-permeable membrane treatment to produce membrane permeate C and concentrate C, a first water mixing means for mixing the other treatment target water B branched by the treatment target water B branching means with at least part of the concentrate A produced in the semi-permeable membrane treatment step A, a mixed water delivery means for delivering the mixed water by the first water mixing means to the semi-permeable membrane treatment step C as treatment target water, and a second treatment target water B delivery means for delivering the other treatment target water B branched by the treatment target water B branching means to the first water mixing means as treatment target water.

2. The water producing system according to claim 1, wherein the semi-permeable membrane treatment step B and the semi-permeable membrane treatment step C are respectively provided with one or more semi-permeable membrane treatment device, at least one semi-permeable membrane treatment device selected from a group of the semi-permeable membrane treatment devices of the semi-permeable membrane treatment step B and the semi-permeable membrane treatment step C is a semi-permeable membrane treatment device X for subjecting both the treatment target water B and the mixed water to the semi-permeable membrane treatment, and the water producing system comprises a treatment target water switching means for switching the treatment target water to be delivered to the semi-permeable membrane treatment device X in such a manner that both the treatment target water B and the mixed water are deliverable to the semi-permeable membrane treatment device X.

3. The water producing system according to claim 2, wherein the semi-permeable membrane treatment device X subjects only one of the treatment target water B and the mixed water to the semi-permeable membrane treatment at one time.

4. The water producing system according to claim 2, wherein the semi-permeable membrane treatment device X communicates with both the delivery means of the first treatment target water B delivery means and the mixed water delivery means.

5. The water producing system according to claim 2, wherein at least one delivery means selected from a group consisting of the first treatment target water B delivery means and the mixed water delivery means is a delivery means Y capable of delivering both the treatment target water B and the mixed water.

6. The water producing system according to claim 5, wherein the delivery means Y delivers one of the treatment target water B and the mixed water selectively.

7. An operation method for a water producing system, wherein in the water producing system according to claim 2 including a first flow rate measuring means for measuring a flow rate of the treatment target water A or the concentrate A, the treatment target water of one or more semi-permeable membrane treatment device X is switched by the treatment target water switching means based on a measured value of the first flow rate measuring means.

8. An operation method for a water producing system, wherein in the water producing system according to claim 2, based on a predetermined value of an accumulated membrane permeate quantity or a predetermined value of a treatment time of one or more semi-permeable membrane treatment device X, the treatment target water of the semi-permeable membrane treatment device X is switched.

9. The water producing system according to claim 1, comprising:
a second water mixing means for mixing the treatment target water A with the concentrate A or the treatment target water B or the mixed water; and a treatment target water A bypass delivery means for delivering the treatment target water A to the second water mixing means.

10. The water producing system according to claim 9, wherein the first water mixing means and the second water mixing means are the same water mixing means.

11. An operation method for a water producing system, wherein in the water producing system according to claim 9 including a second flow rate measuring means for measuring a flow rate of the treatment target water A delivered by the treatment target water A bypass delivery means, the treatment target water of one or more semi-permeable membrane treatment device X is switched by the treatment target water switching means based on a measured value of the second flow rate measuring means.

12. The water producing system according to claim 1, comprising:
a biological treatment device for subjecting organic component contained water to biological treatment to obtain biological treatment water; and
a membrane treatment device A for subjecting the biological treatment water to treatment with a microfiltration membrane or an ultrafiltration membrane to obtain membrane treatment water A,
wherein the membrane treatment water A serves as the treatment target water A.

13. The water producing system according to claim 1, comprising:
a water intake means for taking in salt contained water; and
a membrane treatment device B for subjecting the salt contained water taken in by the water intake means to the treatment with a microfiltration membrane or an ultrafiltration membrane to obtain membrane treatment water B,
wherein the membrane treatment water B serves as the treatment target water B.

14. The water producing system according to claim 13, comprising:
a membrane treatment water B storage reservoir that stores the membrane treatment water B;
a first membrane treatment water B delivery means for delivering the membrane treatment water B to the membrane treatment water B storage reservoir;
a mixed water storage reservoir that stores the mixed water;
a second membrane treatment water B delivery means for delivering the membrane treatment water B of the membrane treatment water B storage reservoir to the mixed water storage reservoir; and
a concentrate A delivery means for delivering the concentrate A to the mixed water storage reservoir, wherein
the first treatment target water B delivery means is a delivery means for delivering the membrane treatment water B stored in the membrane treatment water B storage reservoir to the semi-permeable membrane treatment step B, and
the mixed water delivery means is a delivery means for delivering the mixed water stored in the mixed water storage reservoir to the semi-permeable membrane treatment step C.

* * * * *